(12) United States Patent
Kim et al.

(10) Patent No.: US 9,315,639 B2
(45) Date of Patent: Apr. 19, 2016

(54) OPTICAL FILMS, PHASE DIFFERENCE FILMS, AND LCD COMPRISING THE SAME

(75) Inventors: Hee-Jung Kim, Daejeon (KR);
Dong-Ryul Kim, Daejeon (KR);
Boong-Goon Jeong, Daejeon (KR);
Ju-Eun Cha, Daegu (KR);
Young-Whan Park, Daejeon (KR);
Dae-Woo Nam, Daejeon (KR)

(73) Assignee: LG CHEM, LTD., Seoul (KR)

( * ) Notice: Subject to any disclaimer, the term of this patent is extended or adjusted under 35 U.S.C. 154(b) by 918 days.

(21) Appl. No.: 12/452,016

(22) PCT Filed: Jun. 12, 2008

(86) PCT No.: PCT/KR2008/003305
§ 371 (c)(1),
(2), (4) Date: Dec. 11, 2009

(87) PCT Pub. No.: WO2008/153335
PCT Pub. Date: Dec. 18, 2008

(65) Prior Publication Data
US 2010/0128206 A1    May 27, 2010

(30) Foreign Application Priority Data
Jun. 14, 2007 (KR) .................. 10-2007-0058248
Oct. 30, 2007 (KR) .................. 10-2007-0109747

(51) Int. Cl.
*C09K 19/00* (2006.01)
*C08J 5/18* (2006.01)
(Continued)

(52) U.S. Cl.
CPC ... *C08J 5/18* (2013.01); *G02B 1/04* (2013.01); *G02F 1/13363* (2013.01); *C08J 2351/06* (2013.01); *G02B 5/3083* (2013.01); *G02F 2413/01* (2013.01); *Y10T 428/10* (2015.01)

(58) Field of Classification Search
CPC ...... C08J 5/18; C08J 2351/00; C08J 2351/06; G02B 1/04; C08L 33/08; C08L 33/10; G02F 1/13363; C08F 265/00; Y10T 428/10; Y10T 428/1036; Y10T 428/105
USPC .......... 428/1.1, 1.3, 1.33, 327, 500, 515, 523; 349/97, 117; 252/582, 85
See application file for complete search history.

(56) References Cited

U.S. PATENT DOCUMENTS 4,180,529 A * 12/1979 Hofmann ................. 525/85
7,387,857 B2   6/2008 Oomori et al.
(Continued)

FOREIGN PATENT DOCUMENTS

JP    06-067021    3/1994
JP    06-167612    6/1994
(Continued)

OTHER PUBLICATIONS

Machine English translation of JP 2005-105140A, Sep. 2012.*
(Continued)

*Primary Examiner* — Ruiyun Zhang
(74) *Attorney, Agent, or Firm* — Dentons US LLP (57) ABSTRACT

The present invention relates to an optical film that includes a graft copolymer that includes two types or more of (meth) acryl based resins that have different glass transition temperatures, a retardation film, a method of producing the same, and a polarizing plate and a liquid crystal display device that include the optical film or the retardation film.

12 Claims, 1 Drawing Sheet

(51) Int. Cl.
  *G02B 1/04* (2006.01)
  *G02F 1/13363* (2006.01)
  *G02B 5/30* (2006.01)

(56) References Cited

U.S. PATENT DOCUMENTS

2006/0204744 A1* 9/2006 Hiraishi et al. ............... 428/327
2008/0266493 A1* 10/2008 Yonezawa et al. ............. 349/96

FOREIGN PATENT DOCUMENTS

| JP | 08-053521 | 2/1996 |
|---|---|---|
| JP | 2001-091746 | 4/2001 |
| JP | 2003-329837 | 11/2003 |
| JP | 2004-035853 | 2/2004 |
| JP | 2005-105140 | 4/2005 |
| JP | 2005-156998 | 6/2005 |
| JP | 2006-506471 | 2/2006 |
| JP | 2006-056822 | 3/2006 |
| JP | 2006-143758 | 6/2006 |
| JP | 2007-114762 | 5/2007 |
| WO | WO 96/05261 | 2/1996 |
| WO | WO 2007043356 A1 * | 4/2007 |

OTHER PUBLICATIONS

Brostow etal, Prediction of glass transition temperature of polymer blend and copolymer, Feb. 2008, Materials Letters, p. 3152-3155.*

* cited by examiner

OPTICAL FILMS, PHASE DIFFERENCE FILMS, AND LCD COMPRISING THE SAME

This application claims the benefit of PCT/KR2008/003305 filed on Jun. 12, 2008, Korean Patent Application No. 10-2007-0058248 filed on Jun. 14, 2007 and Korean Patent Application No. 10-2007-0109747 filed on Oct. 30, 2007, all of which are hereby incorporated herein by reference for all purposes in their entirety.

TECHNICAL FIELD

The present invention relates to an optical film, a retardation film, a method of producing the same, and a polarizing plate and a liquid crystal display device that includes the optical film or the retardation film. More particularly, the present invention relates to an optical film in which the mechanical properties and the optical properties are improved and which includes a (meth)acryl based resin, a retardation film, a method of producing the same, and a polarizing plate and a liquid crystal display device that includes the optical film or the retardation film. This application claims priority benefits from Korean Patent Application Nos. 10-2007-0058248, filed on Jun. 14, 2007, and 10-2007-0109747, filed on Oct. 30, 2007, the entire content of which is fully incorporated herein by reference.

BACKGROUND ART

In the case of an acryl based resin, because of its low cost and high transparency, it is useful as a resin for a film. However, an acrylate film that includes an acryl based resin has a problem in that since the acrylate film has the poor mechanical properties, it is insufficient to produce the acrylate film as a desired film. In order to improve this, an effort in which the acrylate film is produced by using a material that is obtained by polymerizing the resin after a soft segment is added to the acryl based resin has been made, but it is required that a film having the desirable mechanical properties is developed.

In addition, the film that is produced by using the styrene based resin is a material that shows an optical anisotropic property in which a refractive index is increased in a direction that is vertical to the alignment direction when the resin is stretched and aligned. It is known that the resin is useful to produce the film having the positive thickness retardation value ($R_{th}$) by stretching it. In addition, the styrene based resin has advantages of excellent economical efficiency and transparency. However, there are problems of insufficient heat resistance and poor mechanical properties, except that the film is produced in conjunction with costly special monomer.

DISCLOSURE

Technical Problem

The present inventors have studied to solve the problems occurring in the related art and found that when a specific type of (meth)acryl based copolymer is used to produce the film, the copolymer has excellent mechanical properties and optical properties, so that it can be shown excellent effect when it is applied as a material for optical film, and in case of using more styrene resin, it can be shown high economical efficiency and excellent properties when it is applied as an optical film or a retardation film.

Therefore, it is an object of the present invention to provide an optical film in which the mechanical properties are improved and which includes a (meth)acryl based resin, a retardation film, a method of producing the same, and a polarizing plate and a liquid crystal display device that includes the optical film or the retardation film.

Technical Solution

In order to accomplish the above object, the present invention provides an optical film comprising a graft copolymer that includes two types or more of (meth)acrylic resins that have different glass transition temperatures. The optical film may further comprise a resin that has styrene or derivatives thereof.

In addition, the present invention provides a method of producing an optical film comprising the steps of a) producing a first (meth)acryl based resin comprising a first (meth)acryl based monomer; b) introducing a functional group that is capable of being reacted with a radical to a main chain of the first (meth)acryl based resin; c) radical polymerizing a second (meth)acryl based monomer in respects to the modified first (meth)acryl based resin that is obtained in step b) to produce a graft copolymer in which the second (meth)acryl based resin that has the different glass transition temperature from that of the first (meth)acryl based resin is subjected to the graft polymerization in respects to the first (meth)acryl based resin; and d) forming a film by using the graft copolymer that is obtained in step c).

In step d), before the film is formed, the film can be formed by blending the graft copolymer and the resin that has the styrene or the derivatives thereof with each other and forming the film by using the blended resin.

In addition, the present invention provides a retardation film comprising a graft copolymer that includes two or more types of (meth)acryl based resins in which glass transition temperatures are different from each other; and a resin that has styrene or derivatives thereof, in which a thickness retardation ($R_{th}$)>0, and an in-plane retardation ($R_{in}$)≠0.

In addition, the present invention provides a method of producing the retardation film comprising the steps of a) blending a graft copolymer that includes two or more types of (meth)acryl based resins in which the glass transition temperatures are different from each other and a resin that has a styrene or derivatives thereof with each other; b) forming the film by using the blending resin that is obtained in the step a); and c) uniaxially or biaxially stretching the film.

In addition, the present invention provides a liquid crystal display device comprising a liquid crystal cell; a first polarizing plate and a second polarizing plate that are positioned on both sides of the liquid crystal cell; and one or more optical films that comprises a graft copolymer that includes two types or more of (meth)acrylic resins that have different glass transition temperatures and are positioned between at least one of the first polarizing plate and the second polarizing plate and the liquid crystal cell. The optical film may further comprise a resin that has styrene or derivatives thereof.

In addition, the present invention provides a liquid crystal display device that comprises the retardation film.

In addition, the present invention provides a polarizing plate comprising an optical film that comprises a polarizer, and a graft copolymer that includes two types or more of (meth)acrylic resins that are positioned on a side or both sides of the polarizer as a protection film and have different glass transition temperatures. The optical film may further comprise a resin that has styrene or derivatives thereof.

In addition, the present invention provides a liquid crystal display device comprising a liquid crystal cell; a first polarizing plate and a second polarizing plate that are positioned on both sides of the liquid crystal cell; and at least one of the first polarizing plate and the second polarizing plate is a polarizer and a polarizing plate that includes an optical film that includes a graft copolymer that includes two types or more of (meth)acrylic resins that have different glass transition temperatures and is positioned on a side or both sides as a protection film. The optical film may further comprise a resin that has styrene or derivatives thereof.

Advantageous Effects

An optical film and a retardation film according to the present invention comprises a graft copolymer comprising two types or more of (meth)acryl based resins that have different glass transition temperatures. Since the mechanical properties and the optical properties are excellent, the film according to the present invention can be usefully used for various purposes, in particular, can be usefully used as the protection film of the polarizing plate. Since the mechanical properties, the heat resistance, and the optical properties are excellent, it is useful to simply produce an excellent liquid crystal display device at low cost.

BEST MODE

Hereinafter, the present invention will be described in more detail.

An optical film according to the present invention is characterized in that the optical film comprises a graft copolymer comprising two types or more of (meth)acrylic resins that have different glass transition temperatures. Since the optical film comprising the graft copolymer as described above according to the present invention has the more excellent mechanical properties and optical properties as compared to a conventional acryl based film, the optical film according to the present invention can be usefully used for various purposes. In addition, the present invention has the effect in which the mechanical properties of the film are improved by adding the graft copolymer to the resin that has styrene or derivatives thereof. In the present specification, it is construed that the (meth)acryl based resin includes all the acryl based resin and the methacryl based resin.

In the present invention, it is preferable that two types or more of (meth)acryl based resins that have different glass transition temperatures do not have compatibility to each other. It is preferable that in the case of at least one of the (meth)acryl based resins, the glass transition temperature is less than 0° C., and in the case of at least one of the (meth) acryl based resins, the glass transition temperature is 0° C. or more. It is preferable that the polymer chain forming a main chain in the graft copolymer is the (meth)acryl based resin in which the glass transition temperature is less than 0° C.

The (meth)acryl based resin is not limited, but may be produced by polymerizing the (meth)acryl based monomer. If necessary, an additional comonomer may be added.

As the (meth)acryl based monomer, it has an alkyl group having 1 to 12 carbon atoms, and preferably an alkyl group having 2 to 8 carbon atoms, an alkylene group, and an aromatic substituent. Examples of the (meth)acrylic acid ester based monomer that has the alkyl group having 1 to 12 carbon atoms may include monomers that are selected from the group consisting of butyl acrylate, butyl methacrylate, 2-ethyl hexyl acrylate, 2-ethyl hexyl methacrylate, methyl acrylate, methyl methacrylate, ethyl acrylate, ethyl methacrylate, n-propyl acrylate, n-propyl methacrylate, iso-propyl acrylate, iso-propyl methacrylate, t-butyl acrylate, t-butyl methacrylate, pentyl acrylate, pentyl methacrylate, n-octyl acrylate, n-octyl methacrylate, iso-nonyl acrylate, iso-nonyl methacrylate, n-tetradecyl acrylate, n-tetradecyl methacrylate, lauryl acrylate, lauryl methacrylate, benzyl acrylate, benzyl methacrylate, and they may be used alone or in a mixture of two or more species. However, the present invention is not limited thereto.

In order to produce the (meth)acryl based resin, a (meth) acrylic acid ester based monomer that has a functional group may be added. Specific examples of the (meth)acrylic acid ester based monomer may include a (meth)acrylic acid ester based monomer that includes hydroxy such as 2-hydroxyethyl(meth)acrylate, 2-hydroxypropyl(meth)acrylate, 4-hydroxybutyl(meth)acrylate, 6-hydroxyhexyl(meth)acrylate, 2-hydroxyethylene glycol(meth)acrylate, 2-hydroxypropylene glycol(meth)acrylate; a (meth)acrylic acid ester based monomer that includes epoxy such as 2-glycidyl(meth)acrylate; and a (meth)acrylic acid ester based monomer that includes carboxylic acid such as acrylic acid, methacrylic acid, acrylic acid dimer, itaconic acid, maleic acid, maleic anhydride, crotonic acid, β-carboxyethyl acrylate, and they may be used alone or in a mixture of two or more species. However, the present invention is not limited thereto.

The (meth)acryl based resin may further include, in addition to the above monomer, other monomers. For example, a vinyl monomer that includes a vinyl cyanide monomer, a maleimide monomer, and an aromatic ring.

Acrylonitrile and the like are used as the vinyl cyanide monomer. Examples of the maleimide monomer include N-phenyl maleimide, N-cyclohexyl maleimide, N-methyl maleimide, N-butyl maleimide and the like. Specific examples of the vinyl monomer that includes the aromatic ring include one or more compounds that are selected from the group consisting of a styrene based monomer, in detail, styrene, a-methyl styrene, 3-methyl styrene, p-methyl styrene, p-ethyl styrene, p-propyl styrene, 4-(p-methylphenyl) styrene, 1-vinyl naphthalene, p-chlorostyrene, m-chlorostyrene and p-nitrostyrene, but not limited thereto.

Any monomers in which the glass transition temperature of a homopolymer of each of them is 0° C. may be used as the monomer that is capable of producing the (meth)acryl based resin in which the glass transition temperature is 0° C. or more among the monomers. In the present invention, representatively, methylmethacrylate (MMA) maybe mainly used. It is preferable that the content of methylmethacrylate is in the amount of 50 mole % or more in the (meth)acryl based resin.

In order to produce the (meth)acryl based resin that has the glass transition temperature of 0° C. or more, in addition to the above monomer, a monomer in which the glass transition temperature of the homopolymer is less than 0° C. may be used as the comonomer. In this case, it may be used while the amount thereof may be controlled so that the glass transition temperature of the copolymer is 0° C. or more.

In addition, among the monomers, a representative example of the monomer that is capable of producing the (meth)acryl based resin in which the glass transition temperature is less than 0° C. may include butylacrylate (BA), and in addition to this, examples of the monomer may include butyl (meth)acrylate, ethyl(meth)acrylate, methyl(meth)acrylate, n-propyl(meth)acrylate, isopropyl(meth)acrylate, t-butyl (meth)acrylate, pentyl(meth)acrylate, n-octyl(meth)acrylate, n-tetradecyl(meth)acrylate, 2-ethylhexyl(meth)acrylate, lauryl(meth)acrylate, benzyl(meth)acrylate and the like, and these monomers may be used alone or in a mixture of two or more species.

In particular, in the case of when the (meth)acryl based resin in which the glass transition temperature is less than 0° C. forms a main chain of the graft copolymer, a method in which a functional group that is capable of being reacted with radicals is introduced in the (meth)acryl based resin in which the glass transition temperature is less than 0° C. may be used so that the resin having the different glass transition temperature, for example, the (meth)acryl based resin in which the glass transition temperature is 0° C. or more is subjected to the graft polymerization in conjunction with the main chain of the copolymer. At this time, in order to introduce a functional group that is capable of being reacted with radicals in the (meth)acryl based resin in which the glass transition temperature is less than 0° C., in addition to the above (meth)acryl based monomer, it is preferable to add the (meth)acryl is acid ester based monomer that has the functional group.

Examples of the (meth)acrylic acid ester based monomer that has the functional group may include a (meth)acrylic acid ester based monomer that includes hydroxy such as 2-hydroxyethyl(meth)acrylate, 2-hydroxypropyl(meth)acrylate, 4-hydroxybutyl(meth)acrylate, 6-hydroxyhexyl(meth)acrylate, 2-hydroxyethylene glycol(meth)acrylate, 2-hydroxypropylene glycol(meth)acrylate; a (meth)acrylic acid ester based monomer that includes epoxy such as 2-glycidyl(meth)acrylate; and a (meth)acrylic acid ester based monomer that includes a carboxylic acid such as an acrylic acid, a methacrylic acid, an acrylic acid dimer, an itaconic acid, a maleic acid, a maleic anhydride, a crotonic acid, β-carboxyethyl acrylate, and they may be used alone or in a mixture of two or more species. However, the present invention is not limited thereto.

In order to produce the (meth)acryl based resin in which the glass transition temperature is less than 0° C., in addition to the above monomer, a monomer in which the glass transition temperature of the homopolymer is 0° C. or more maybe used as the comonomer. In this case, it maybe used while the amount thereof may be controlled so that the glass transition temperature of the copolymer is less than 0° C.

In the present invention, in the graft copolymer that includes two or more types of (meth)acryl based resins in which the the glass transition temperatures are different from each other, the (meth)acryl based resin in which the glass transition temperature is low may form a main chain of the (meth)acryl based resin, and the (meth)acryl based resin in which the glass transition temperature is high may form a side chain, and vice versa. In the present invention, it is preferable that in the graft copolymer, the (meth)acryl based resin in which the glass transition temperature is low form a main chain of the (meth)acryl based resin, and the (meth)acryl based resin in which the glass transition temperature is high may form a side chain. For example, in the graft copolymer, one or more types of (meth)acryl based resins in which the glass transition temperature is less than 0° C. may form a main chain, and one or more types of (meth)acryl based resins in which the glass transition temperature is 0° C. or more may form a side chain.

In the graft copolymer, a weight average molecular weight is preferably in the range of 50000 to 2000000, and more preferably in the range of 50000 to 500000, and a number average molecular weight is preferably in the range of 10000 to 1000000, and more preferably in the range of 10000 to 300000.

In the present invention, the content ratio of the (meth)acryl based resin in which the glass transition temperature is less than 0° C. and the (meth)acryl based resin in which the glass transition temperature is 0° C. or more is in the range of 95:5 to 5:95, and more preferably 90:10 to 10:90.

In the present invention, as the resin that has the styrene or derivatives thereof, the resin is not particularly limited if the resin includes 30% by weight or more of styrene or derivatives thereof therein. In detail, examples of the resin that has styrene or derivatives thereof and is capable of being used in the present invention may include polystyrene, SAN (styrene acrylonitrile copolymer) and the like.

In the present invention, the graft polymer and the resin that has styrene or derivatives thereof can be mixed with each other in a weight ratio in the range of 95:5 to 5:95, and in particular, in order to show the desired physical properties, it is preferable that styrene or derivatives thereof is included in an amount of 20% by weight or more in the blending resin that is obtained after the blending.

According to an embodiment of the present invention, it is provided a method of producing an optical film, which includes a) producing a first (meth)acryl based resin that includes a first (meth)acryl based monomer; b) introducing a functional group that is capable of being reacted with a radical to a main chain of the first (meth)acryl based resin; c) radical polymerizing a second (meth)acryl based monomer in respects to the modified first (meth)acryl based resin that is obtained in the step b) to produce a graft copolymer in which the second (meth)acryl based resin that has the different glass transition temperature from that of the first (meth)acryl based resin is subjected to the graft polymerization in respects to the first (meth)acryl based resin; and d) forming the film by using the graft copolymer that is obtained in the step c).

Before the film is formed in the step d), after the graft copolymer and the resin that has the styrene or the derivatives thereof is blended with each other, the film may be formed by using the blended resin.

The step a) is a step for producing the first (meth)acryl based resin, and in order to introduce the functional group that is capable of being reacted with the radical to the main chain of the first (meth)acryl based resin in the step b), which is performed in a next process, it is preferable that the (meth)acrylic acid ester based monomer having various functional groups is added to the first (meth)acryl based monomer. Preferable examples of the (meth)acrylic acid ester based monomer that has the functional group may include a (meth)acrylic acid ester based monomer that includes hydroxy such as 2-hydroxyethyl(meth)acrylate, 2-hydroxypropyl(meth)acrylate, 4-hydroxybutyl(meth)acrylate, 6-hydroxyhexyl(meth)acrylate, 2-hydroxyethylene glycol(meth)acrylate, and 2-hydroxypropylene glycol(meth)acrylate; a (meth)acrylic acid ester based monomer that includes epoxy such as 2-glycidyl(meth)acrylate; and a (meth)acrylic acid ester based monomer that includes a carboxylic acid such as an acrylic acid, a methacrylic acid, an acrylic acid dimer, an itaconic acid, a maleic acid, a maleic anhydride, a crotonic acid, p-carboxyethyl acrylate, but is not limited thereto. The amount of the (meth)acrylic acid ester based monomer that has the functional group which is added to produce the first (meth)acryl based resin is in the range of 0.1-50 mol %, and more preferably in the range of 0.1-10 mol %.

Subsequently, the step b) is a step in which a functional group that is capable of being reacted with a radical is introduced into the main chain of the first (meth)acryl based resin that is produced in the step a). Examples of the functional group that is capable of being reacted with the radical include the —SH group.

In detail, in an embodiment of the step b), as a method for introducing the —SH group to the first (meth)acryl based resin, a method that comprises a step for esterifying a hydroxy group or a carboxyl is group and a mercaptoacetic acid, mercapto alcohol, or mercapto ester in the resin under the presence or absence of a catalyst may be used. In this step, the amount of the —SH group that is capable of being introduced in respects to the first (meth)acryl based resin may be various according to the reaction condition. For example, the concentration of the —SH group may be variously introduced by controlling the degree of esterification in the amount of 0.1-100 mole %, and more preferably 50-100 mole % in respects to the functional group of the whole hydroxy group or the carboxyl group.

Examples of the catalyst that is capable of being used in the step b) may representatively include an acid catalyst. Examples of the acid catalyst that is capable of being used according to this may include an inorganic salt of a sulfuric acid or a chloric acid, an organic acid such as a methane sulfonic acid, a paratoluene sulfonic acid and the like, a Lewis acid such as a boronic acid and the like and the like. The amount of the acid catalyst that is used in the step b) is not limited.

The first (meth)acryl based resin into which the mercapto group is introduced may act as a chain transfer agent in the course of a next radical polymerizing, and function to provide an active site of the graft polymerization (see [Journal of Polymer Science 1959, p 411-423]).

In the step c), a second (meth)acryl based monomer may be added in respects to the modified first (meth)acryl based resin that is obtained in the step b) and radical polymerized to produce a graft copolymer in which the second (meth)acryl based resin that has the different glass transition temperature from that of the first (meth)acryl based resin is subjected to the graft polymerization in respects to the first (meth)acryl based resin.

In the step c), the addition amount of the modified first (meth)acryl based resin that is obtained in the step b) may be generally variously control led in the range of 1 to 50 parts by weight in respects to 100 parts by weight of the second (meth) acryl based monomer. The second (meth)acryl based monomer means a (meth)acryl based monomer that is capable of being included in the second (meth)acryl based resin that has the different glass transition temperature from that of the first (meth)acryl based resin, and an example thereof is as described above. In the method of producing the optical film according to the present invention, the first (meth)acryl based resin is a (meth)acryl based resin in which the glass transition temperature is less than 0° C., and the second (meth)acryl based resin is a (meth)acryl based resin in which the glass transition temperature is more than 0° C.

In the step c), in addition to the second (meth)acryl based monomer, the (meth)acrylic acid ester based monomer that has the functional group may be further added. Preferable examples of the (meth)acrylic acid ester based monomer that has the functional group are the same as those that are capable of being used in the step a).

As a radical polymerization in the step c, a method that is known in the art maybe used, and the scope of the present invention is not limited to the polymerization method. For example, a bulk polymerization, a solution polymerization, a suspension polymerization, an emulsion polymerization and the like may be possible, but are not limited thereto.

As the polymerization initiator, for example, an initiator that is activated by heating or an initiator that is'activated by light may be used. In detail, the initiator that is activated by heating such as an azo compound such as azobis(isobutyloni-trile), a peroxid compound such as benzoyl peroxide and the like, or an initiator that is activated by light such as benzophenone, benzoine ethyl ether, 2,2'-dimetoxy-2-phenyl acetophenoen and the like may be used, but are not limited thereto. The amount of the polymerization initiator is not limited, but in order to obtain an appropriate molecular weight of the graft copolymer that is obtained finally, in general, in respects to the second (meth)acryl based monomer, it is preferable that the weight ratio is in the range of 0.01 to 5, and more preferably, the weight ratio is in the range of 0.1 to 1.

In addition, in order to appropriately control the molecular weight, a chain transfer agent may be added. As an appropriate chain transfer agent, a mercaptane system such as dodecyl mercaptane, lauryl mercaptane or alpha methyl styrene dimer and the like are appropriate.

The reaction temperature of the polymerization may vary slightly for the balance in respects to the other polymerization conditions, and maybe generally in the range of 30~130° C., preferably 40~120° C., and more preferably 40~90° C. In addition, the reaction time is different according to the reaction conditions such as the reaction temperature, the type of monomer, or the concentration, but may be generally in the range of 2~24 hours. While the radical polymerization is performed, the block copolymer may further include a filler, a reinforcing agent, a stabilizer, a coloring agent, and antioxidant, if necessary.

Examples of the solvent that is used in the polymerization may include ethers such as tetrahydrofuran, diethyl ether, and dioxane, hydrocarbons such as n-hexane, petroleum ether, toluene, bezene, and xylene, alcohols such as methanol, ethanol, and isopropanol, ketones such as acetone, methyl ethyl ketone, and methylisobutylketone, acetonitrile, N,N-dimethyl formamide, and dimethyl sulfoxide. Such solvents maybe used singly or in combination of two or more. The polymerization reaction is preferably performed under inert gas atmosphere. Examples of the inert gas may include nitrogen gas and argon gas.

In the above method, the molecular weight, the degree of graft and thermal stability of the graft copolymer can be controlled by controlling the amount of a precursor, a polymerization initiator, and the second (meth)acryl based monomer for introducing a functional group that is capable of being reacted with a radical to a main chain of the first (meth)acryl based resin.

In step d), the graft copolymer may be used to produce the optical film by using a general film producing method such as an extrusion shaping method, an inflation shaping method, or a solution softening method as a primary shaping processing process. It is preferable that the optical film is used itself, that is, while the optical film is not stretched, for the industrial used, and in the next step, a retardation difference may be provided by a stretching processing operation that is a secondary shaping processing process to use the optical film as the retardation film.

In step d), in the case of when the copolymer is blended with styrene or the derivatives thereof, the blending condition is not particularly limited, and may be applied to an extrusion process that is generally applied.

In addition, when the optical film according to the present invention is produced, in addition to the above graft copolymer to improve the productivity, a commercialized acryl resin may be mixed. At this time, the mixing ratio of the graft copolymer and the acryl based resin is not particularly limited, and may be mixed in the range in which the mechanical properties of the obtained optical film are not reduced. Preferably, the mixing is possible so that the weight ratio between the graft copolymer and the acryl based resin is in the range of 95:5 to 5:95, and more preferably, the weight ratio is in the range of 80:20 to 20:80. In the case of when the weight ratio of the acryl based resin is exceeded 95%, it cannot have physical properties that are appropriate for the use as the optical film. The specific type of the the acryl based resin is not particularly limited, and a commercial type may be used. For example, polymethyl methacrylate (PMMA) and the like may be used.

In the case of producing the film by using an extrusion shaping method as the primary shaping process method, the film that has a predetermined thickness can be produced by passing it through a thin interval of a die that is called as a T-die. At this time, in order to prevent poorness of the appearance by bubbling of the gas, it is preferable that the graft copolymer is preliminarily heated and dried at a temperature in the range of 80 to 130° C. It is preferable that the extrusion shaping is performed at a temperature that is sufficiently higher than a glass transition temperature in which the graft copolymer is melted and flows in order to suppress the alignment of the molecular chain. After passing through the die, in order to cool and solidify the film that is present in a melted state, a low temperature metal roller or a steal belt may be used.

In the case of when the film is produced by using the solution softening method as the primary shaping processing method, a solvent that is capable of being used by each resin may be selected, and if necessary, a plurality of solvents may be used. Specific examples of the solvent that is capable of being used in the solution softening method may include methylene chloride, chloroform, chlorobenzene, 1,4-dioxane, 1,3-dioxolane, tetrahydrofurane and the like, but are not limited thereto. In particular, in order to control the volatilization rate, a good solvent and a poor solvent may be combined with each other in respects to the graft copolymer. When the drying in the solution softening method, according to the settlement of the heating condition, bubbles or inner voids are not formed in the film, and it is preferable that the concentration of the residual solvent is 0.1 wt % or less.

It is preferable that the thickness of the optical film that is produced by using the primary shaping processing by the above method is in the range of 30 to 500 μm (micrometers).

In the case of when the optical film that is produced as described above is additionally stretched, if the glass transition temperature of the graft copolymer is Tg, it may be performed at a temperature in the range of Tg−20° C.~Tg+30° C. The glass transition temperature means a temperature in the range of a temperature at which the storage elasticity of the graft copolymer starts to be reduced to allow the loss elasticity to be higher than the storage elasticity to a temperature at which the alignment of the polymer chains becomes loose and thus vanishes. The glass transition temperature may be measured by using a differential scanning calorimeter (DSC).

The present invention provides a retardation film that comprises a graft copolymer that includes two or more types of (meth)acryl based resins in which glass transition temperatures are different from each other; and a resin that has styrene or derivatives thereof. In the retardation film, a thickness retardation ($R_{th}$)>0, and an in-plane retardation ($R_{in}$)≠0. It is preferable that the thickness of the retardation film is in the range of 30 to 200 μm (micrometers). It is preferable that the in-plane retardation value of the retardation film is in the range of 0 to +400 nm and the value of the thickness retardation is in the range of 0 to +400 nm.

In the specification of the present invention, the thickness retardation ($R_{th}$) and the in-plane retardation ($R_{in}$) are defined as the following equations:

$$R_{th}=d\{n_z-(n_x+n_y)/2\}$$

$$R_{in}=d(n_x-n_y)$$

wherein, the x-axis direction refractive index is $n_x$, the y-axis direction refractive index is $n_y$, the thickness direction refractive index is $n_z$, and the thickness of the film is d.

The retardation film according to the present invention may be produced by after the film is shaped as described in the production method of the optical film, (c) further uniaxially or biaxially stretching the film. In the present invention, the film that includes the components as described above may be uniaxially stretched or uniaxially stretched while the stretching ratios of the biaxises to provide the retardation film in which the thickness retardation ($R_{th}$)>0 and the in-plane retardation ($R_{in}$)≠0. The retardation film may provide optical properties that are required in a liquid crystal display device, in particular, an IPS type of the liquid crystal display device.

The stretching, if the glass transit ion temperature of the blending resin is Tg, may be performed at a temperature in the range of Tg−20° C.~Tg+30° C. The glass transition temperature means a temperature in the range of a temperature at which the storage elasticity of the block copolymer starts to be reduced to allow the loss elasticity to be higher than the storage elasticity to a temperature at which the alignment of the polymer chains becomes loose and thus vanishes. The glass transition temperature may be measured by using a differential scanning calorimeter (DSC).

The stretching rate can be appropriately controlled according to the retardation and the thickness of the film. In general, the stretching can be performed while the stretching rate that is calculated by the following equation is in the range of 50%/min to 500%/min.

stretching speed (%/min)={(width direction dimension after stretching/width direction dimension before stretching)−1}×100 (%)/time needed for stretching (min)     [Equation]

In the method of producing the retardation film according to the present invention, the stretching ratio may be appropriately controlled according to the retardation and the thickness of the film, and in general, the stretching can be performed in the range of 10% to 100%.

In addition, the present invention provides a liquid crystal display device that comprises a liquid crystal cell; a first polarizing plate and a second polarizing plate that are positioned on both sides of the liquid crystal cell; and one or more optical films according to claim 1 or 2 that are positioned between at least one of the first polarizing plate and the second polarizing plate and the liquid crystal cell and include the graft copolymer that includes two or more types of the (meth)acryl based resins in which the glass transition temperatures are different from each other. The optical film may further include the resin that includes styrene or derivatives thereof.

In addition, the present invention provides a liquid crystal display that includes the retardation film.

In addition, the present invention provides a polarizing plate that includes an optical film that comprises a polarizer and a graft copolymer that includes two types or more of (meth)acryl is resins that are positioned on a side or both sides of the polarizer as a protection film and have different glass transition temperatures. The optical film may further include a resin that has styrene or derivatives thereof.

In the case of disposing the optical film according to the present invention to only one side of polarizer as the protection film, a protection film that is known in the art may be positioned on the other side thereof. Examples of the protection film disposed as a protection film to the other side may include a triacetate cellulose (TAC) film, an ROMP (ring opening metathesis polymerization) polynorbornene-based film, an HROMP (ring opening metathesis polymerization followed by hydrogenation) polymer film, which is obtained by hydrogenating a ring opening metathesis polymerized cycloolefin-based polymer, a polyester film, and an addition polymerization polynorbornene-based film. In addition, a film made from a transparent polymer may be available as the protection film, but is not limited thereto.

As a polarizer, a film which contains iodine or dichromatic dyes and is made of polyvinyl alcohol (PVA) may be used. The polarizer may be produced by applying iodine or dichromatic dyes on the PVA film. However, the production method of the polarizing plate is not limited. In the specification, the polarizer does not include the protective film, and the polarizing plate includes the polarizer and the protective film.

In the polarizing plate according to the present invention, the protection film and the polarizer may be combined by using the method that is known in the art.

For example, the combination of the protection film and the polarizer may be performed by using an attachment process using an adhesive. That is, first, the adhesive is coated on the surface of the PVA film that is the protective film of the polarizer or the polarizer by using a roll coater, a gravure coater, a bar coater, a knife coater, a capillary coater, or the like. Before the adhesive is completely dried, the protective film and the polarizer are combined with each other using heat pressing or pressing at normal temperature by means of a combination roll. When a hot melt type adhesive is used, it is required that the heat pressing roll is used.

Examples of the adhesive which is capable of being used to combine the protection film and the polarizer include, but are not limited to, a one- or two-liquid type polyvinyl alcohol (PVA) adhesive, a polyurethane based adhesive, an epoxy based adhesive, a styrene-butadiene rubber (SBR) based adhesive, a hot melt type adhesive and the like. If the polyurethane based adhesive is to be used, it is preferable to use the polyurethane based adhesive produced by using an aliphatic isocyanate compound which does not cause yellowing due to light. If an one- or two-liquid type dry laminate adhesive or an adhesive having relatively low reactivity in respects to isocyanate and a hydroxy group is used, a solution type adhesive which is diluted with an acetate solvent, a ketone solvent, an ether solvent, or an aromatic solvent may be used. In this connection, it is preferable that the adhesive have low viscosity of 5000 cps or less. Preferably, the adhesive has excellent storage stability and light transmittance of 90% or more at a wavelength of 400 to 800 nm.

A gluing agent may be used as long as it has desirable adhesiveness. It is preferable that the gluing agent is sufficiently cured by heat or ultraviolet rays after the combination so that mechanical strength required in the adhesive is ensured, and interfacial adhesion strength is large so that stripping does not occur as long as anyone of both sides of the film to which the gluing agent is attached is not destroyed.

Specific examples of the gluing agent may include natural rubber, synthetic rubber, or elastomer having excellent optical transparency, a vinyl chloride/vinyl acetate copolymer, polyvinyl alkyl ether, polyacrylate, denatured polyolefin gluing agent, and a curable adhesive containing a curing agent such as isocyanate.

In addition, the present invention provides a liquid crystal display device that comprises a liquid crystal cell; a first polarizing plate and a second polarizing plate that are positioned on both sides of the liquid crystal cell; and at least one of the first polarizing plate and the second polarizing plate is a polarizer and a polarizing plate that is positioned on a side or both sides as a protection film and includes the optical film including the graft copolymer that includes two or more types of the (meth)acryl based resins in which the glass transition temperatures are different from each other. The optical film may further include the resin that includes styrene or derivatives thereof.

The optical film or the retardation film may be positioned in the liquid crystal display device by one or two pieces. It is preferable that the liquid crystal display device according to the present invention is an IPS mode.

Figure 1:
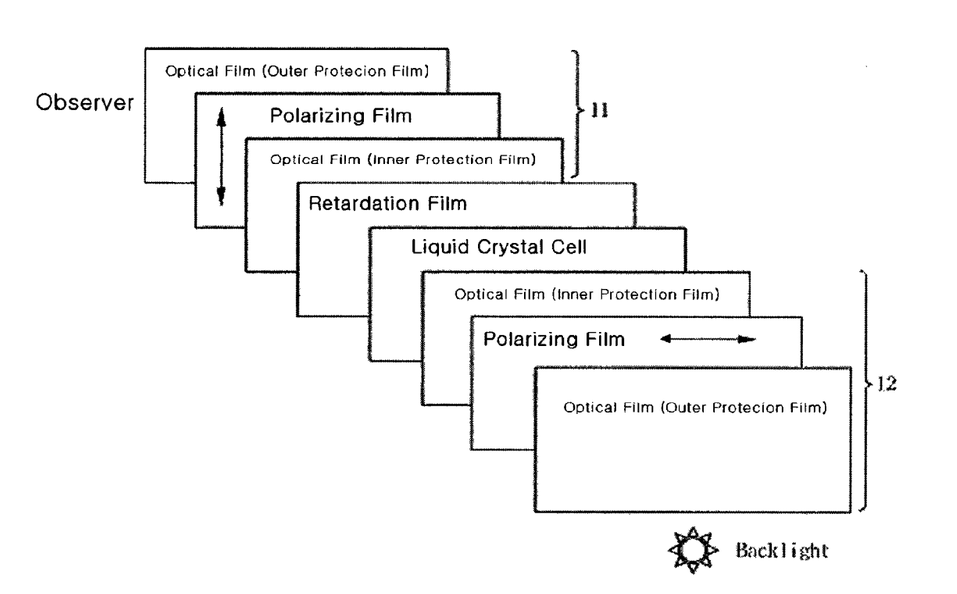
FIG. 1 is a view that schematically illustrates a structure of a liquid crystal display device in which an optical film according to the present invention is applied as a protection film of a polarizing plate.

If the above liquid crystal display device is watched through exemplified FIG. 1, it is as follows. In FIG. 1, the optical film according to the present invention may be positioned as the protection film on a side or both sides of the polarizing film of at least one of the polarizing plate 11 and the polarizing plate 12. The optical film according to the present invention may be positioned as the inner protection film or as the outer protection film. In FIG. 1, the retardation film is shown, but the presence of the retardation film is not necessary. In addition, in FIG. 1, a backlight is positioned at the polarizing plate 12, but the backlight may be positioned at the polarizing plate 11.

The liquid crystal display device that includes the polarizing plate according to the present invention as described above may further comprise the optical film according to the present invention between the polarizing plate and the liquid crystal cell.

A better understanding of the present invention will be described in light of the following Examples which are set forth to illustrate, but are not to be construed to limit the present invention.

[Mode for Invention]

EXAMPLE 1

Production of the Graft Copolymer

1. Production of the First Acryl Based Resin [A]

93 g of butylacrylate, 7 g of 2-hydroxyethylacrylate, 43 g of toluene and 0.2 g of the initiator AIBN, and 0.1 g of 1-octylmercaptane were dropped at 70° C. into the reactor having the volume of 250 ml for 4 hours, and additionally polymerized for 3 hours at 95° C. to produce the polymer. The unreacted monomer in the solution was measured by using the gas chromatography, and it was confirmed that the conversion ratio was 98% (molecular weight: Mw=215 k, Mn=70 k).

2. Introduction of the Functional Group Capable of Being Reacted with the Radical to the Main Chain of the First Acryl Based Resin 200 g of toluene was further added to 200 g of the first acryl based resin [A] solution, 1 g of the p-toluene sulfonic acid, and 6 g of the thioglycolic acid were put thereinto after the reaction was finished, it was dropped to methanol, and they were reacted for 4 hours while they were refluxed. Subsequently, after toluene was added to the precipitate, it was heated to remove methanol in the polymer as the azeotrope. Through this process, the first acryl based resin [A'] polymer solution that had SH could be obtained.

3. Graft Polymerization 32 g of the modified first acryl based resin [A'] solution (TSC 40%), 79.17 g of MMA, 4.17 g of MA, 0.26 g of AIBN were put into the polymerization device that had the volume of 250 mL, and were reacted for 12 hours while maintaining under the nitrogen atmosphere at 70° C. After the reaction was finished, the polymerization solution was precipitated in methanol to obtain the graft copolymer (copolymer 1).

The copolymers 2 and 3 were subjected to the polymerization as described in the following Table 1 to obtain the polymer in which the second (meth)acryl based resin was grafted in respects to the first (meth)acryl based resin.

TABLE 1

|  | Exp. No. | | |
| --- | --- | --- | --- |
|  | Copolymer 1 | Copolymer 2 | Copolymer 3 |
| MMA (g) | 79.17 | 79.17 | 79.17 |
| MA (g) | 4.17 | 4.17 | 4.17 |
| Toluene (g) | 134 | 84 | 65 |
| [A'] solution (g) | 32 | 32 | 32 |
| AIBN (g) | 0.26 | 0.26 | 0.26 |
| TSC (%) | 40 | 50 | 55 |
| Polymerization temperature (° C.) | 70 | 70 | 70 |
| Mw | 294 k | 221 k | 288 k |
| Mn | 31 k | 34 k | 67 k |
| PDI | 9.42 | 6.48 | 4.28 |
| Conversion (%) | 79 | 80 | 82 |

EXAMPLES 2 to 4

Production of the Graft Copolymer

1. Production of the First Acryl Based Resins [B], [C], [D]

The amounts were the same as Example 1, except that the amounts of butylacrylate, 2-hydroxyethylacrylate, toluene, initiator AIBN, and 1-octylmercaptane were used as described in the following Table 2.

TABLE 2

|  | First acryl based resin | | | |
| --- | --- | --- | --- | --- |
|  | [A] | [B] | [C] | [D] |
| BA (g) (butyl acrylate) | 93 | 97 | 97 | 97.5 |
| HEA (g) (hydroxy ethyl aclyate) | 7 | 3 | 3 | 2.5[1)] |
| Toluene (g) | 43 | 100 | 60 | 21 |
| AIBN (g) | 0.2 | 0.7 | 0.2 | 0.04 |
| 1-octyl mercaptane (g) | 0.1 | 0.73 | 0.15 | 0.16 |
| Coversion (%) | 98 | 98 | 97 | 95 |
| Mw | 215 k | 43.3 k | 95 k | 123 k |
| Mn | 70 k | 15.3 k | 40 k | 51 k |
| PDI | 3.09 | 2.9 | 2.3 | 2.1 |

[1)]4-hydroxybutylacrylate

2. Introduction of the Functional Group Capable of Being Reacted with the Radical into the Main Chain of the First Acryl Based Resin The same thing as Example 1 was used, except for the description in Table 3 to produce the modified first acryl based resins [B'], [C'] and [D'] that had various contents of functional groups and the molecular weights.

TABLE 3

|  | Preparation Example of the first acryl based resin including SH | | | |
| --- | --- | --- | --- | --- |
|  | [A'] | [B'] | [C'] | [D'] |
| First acryl based resin | [A] | [B] | [C] | [D] |
| The amount of the first acryl based resin solution (g) | 200 | 200 | 200 | 200 |
| Toluene (g) | 200 | 200 | 200 | 200 |
| Thioglycolic acid | 6 | 5 | 5 | 4 |
| The amount of the acid catalyst | 1 | 0.8 | 0.8 | 1 |

Acid catalyst: p-toluene sulfonic acid

3. Graft Polymerization (1) Copolymer 4 and 5

20 g of the modified first acryl based resin [B'] solution (TSC 50%), 95 g of MMA, 5 g of MA, 0.26 g of AIBN, and 140 g of toluene were put into the polymerization device that had the volume of 250 mL, and they were reacted with each other for 12 hours while maintaining at 70° C. under the nitrogen atmosphere. After the reaction was finished, the polymerization solution was precipitated in methanol to obtain the graft copolymer (copolymer 4 and 5).

TABLE 4

| Ingredients (Net) | Copolymer 4 | Copolymer 5 |
| --- | --- | --- |
| MMA | 95 | 95 |
| MA | 5 | 5 |
| AIBN | 0.26 | 0.26 |
| Toluene | 140 | 140 |
| [B'] solution | 20 | 20 |
| TSC (%) | 50 | 50 |
| Mw | 248 k | 300 k |
| Mn | 39 k | 40 k |
| PDI | 6.5 | 7.44 |
| Conversion (%) | 83 | 79 |
| Tg (° C.) | 112 | 110 |

(2) Copolymer 6 and 8

20 g of the modified first acryl based resin [C'] solution (TSC 50%), 72 g of MMA, 9 g of AN (acrylonitrile), 9 g of CHMI (N-cyclohexylmaleimide), 0.24 g of AIBN, and 90 g of toluene were put into the the polymerization device that had the volume of 250 mL, and they were reacted with each other while increasing to the reaction temperature from 70° C. to 80° C. for 4 hours under the nitrogen atmosphere, increasing to the reaction temperature from 80° C. to 100° C. for 4 hours, and maintaining for 1 hour. After the react ion was finished, the polymerization solution was precipitated in methanol to obtain the graft copolymers. The graft copolymers were dried at 90° C. in the oven to obtain the final polymers (copolymer 6 to 8).

TABLE 5

|  | Copolymer 6 | Copolymer 7 | Copolymer 8 |
| --- | --- | --- | --- |
| MMA (g) | 72 | 72 | 72 |
| CHMI (g) | 9 | 9 | 9 |
| AN (g) | 9 | 9 | 9 |
| Toluene (g) | 90 | 90 | 90 |
| [C'] solution (g) | 20 | 20 | 20 |
| AIBN (g) | 0.24 | 0.1 | 0.24 |
| Tsc (%) | 50 | 50 | 50 |
| Mw | 181 k | 204 k | 227 k |
| Mn | 50 k | 49 k | 59 k |
| PDI | 3.62 | 4.16 | 3.85 |
| Conversion (%) | 85.0 | 80 | 93.0 |
| A change of the reaction temperature | 70 → 80 (4 hr increasing temperature), 80 → 100 (4 hr | 50 (3 hr maintain), 70 (2 hr maintain), 100 (4 hr increasing temperature) | 60 → 80 (8 hr increasing temperature) → 100 (4 hr |

TABLE 5-continued

| | Copolymer 6 | Copolymer 7 | Copolymer 8 |
|---|---|---|---|
| | increasing temperature), 1 hr maintain | | increasing temperature) |

(3) Copolymer 9 and 12

20 g of the modified first acryl based resin [D'] solution (TSC 50%), 85.5 g of MMA, 4.5 g of MA, 0.2 g of AIBN, and 90 g of toluene were put into the the polymerization device that had the volume of 250 mL, and they were reacted with each other while increasing to the reaction temperature from 60° C. to 80° C. for 8 hours under the nitrogen atmosphere. After the reaction was finished, the polymerization solution was precipitated in methanol to obtain the graft copolymers. The graft copolymers were dried at 90° C. in the oven to obtain the final polymers (copolymer 9 to 12).

TABLE 6

| | Copolymer 9 | Copolymer 10 | Copolymer 11 | Copolymer 12 |
|---|---|---|---|---|
| MMA (g) | 85.5 | 85.5 | 85.5 | 76 |
| MA (g) | 4.5 | 4.5 | 4.5 | 4 |
| Toluene (g) | 90 | 90 | 90 | 80 |
| [C'] solution (g) | 20 | 20 | 20 | 40 |
| AIBN (g) | 0.2 | 0.2 | 0.2 | 0.4 |
| Tsc (%) | 50 | 50 | 50 | 50 |
| Mw | 368 k | 261 k | 221 k | 281 k |
| Mn | 68 k | 71 k | 53 k | 33 k |
| PDI | 5.8 | 3.18 | 4.1 | 7.78 |
| Conversion (%) | 65 | 60 | 80 | 90 |
| A change of the reaction temperature | 60 → 80 (8 hr increasing temperature) | 60 → 80 (8 hr increasing temperature) | | 60 → 80 (7 hr increasing temperature), → 95 (5 hr increasing temperature) |

<Production of the Film>

7.5 g of the graft copolymer that was produced in Preparation Example was put into 42.5 g of dichloroethane, and agitated for 24 hours at 30° C. to produce the uniform solution. It was filtered by using the filter that had the size of 5 μm (micrometers) to remove the insoluble material and the dust, and the 15 wt % casting solution was produced. The casting solution was poured to the glass plate for a LCD substrate, subjected to the casting at a rate of 0.3 m/min by using the doctor blade, and dried at the room temperature for 60 min. Next, at 60° C. for 60 min and at 115° C. for 90 min, it was dried to remove the solvent, and the polymer film was removed. The physical properties of the produced film are described in the following Table 7. The whole transmittance and the haze of the film were measured by using the reflectance-transmittance meter (HR-100, Murakami color research Lab.). In each case, the whole transmittance of the film was 90% or more, and the haze was the same as the results of the following Table 7. In addition, since the graft copolymer films that were obtained in each case were not bent when they were folded, it could be seen that the degree of roughness was more improved as compared to the known polymethyl methacrylate resin.

TABLE 7

| Type of the copolymer | Thickness of the film (μm) | transmittance (%) | Haze (%) | Toughness |
|---|---|---|---|---|
| Copolymer 1 | 96 | 92 | 0.2 | Tough |
| Copolymer 2 | 90 | 93 | 0.3 | Tough |
| Copolymer 3 | 80 | 91 | 0.4 | Tough |
| Copolymer 4 | 66 | 93 | 0.3 | Tough |

TABLE 7-continued

| Type of the copolymer | Thickness of the film (μm) | transmittance (%) | Haze (%) | Toughness |
|---|---|---|---|---|
| Copolymer 5 | 87 | 91 | 0.4 | Tough |
| Copolymer 6 | 86 | 90 | 0.4 | Tough |
| Copolymer 7 | 74 | 90 | 0.4 | Tough |
| Copolymer 10 | 87 | 92 | 0.5 | Tough |

In addition, the results after the film of the graft copolymer that was produced in the above Examples are described in the following Table 8. If the results were examined, it could be seen that since the in-plane retardation and the thickness retardation are low, it could be suitable to use as the optical film.

TABLE 8

| | Stretching temperature (° C.) | Stretching ratio (%) | Stretching rate (mm/min) | Thickness of the film (μm) | in-plane retardation value (nm) | Thickness retardation value (nm) |
|---|---|---|---|---|---|---|
| Copolymer 1 | 115 | 25 | 50 | 95 | 9.5 | 10.8 |
| | 115 | 50 | 50 | 76 | 13.9 | 16 |
| | 115 | 100 | 50 | 66 | 19.4 | 22.5 |
| Copolymer 4 | 117 | 25 | 50 | 62 | 2.1 | 2.4 |
| | 117 | 50 | 50 | 53 | 3.5 | 3.9 |
| | 117 | 100 | 50 | 40 | 5.2 | 6.1 |
| Copolymer 5 | 142 | 100 | 50 | 66 | 8.3 | 7.6 |
| | 142 | 50 | 50 | 74 | 5.8 | 4.1 |
| | 142 | 25 | 50 | 82 | 3.7 | 2.7 |

TABLE 8-continued

|  | Stretching temperature (° C.) | Stretching ratio (%) | Stretching rate (mm/min) | Thickness of the film (μm) | in-plane retardation value (nm) | Thickness retardation value (nm) |
|---|---|---|---|---|---|---|
| Copolymer 7 | 118 | 100 | 50 | 55 | 1.2 | 0.7 |
|  | 118 | 50 | 50 | 64 | 0.4 | 0.5 |
|  | 118 | 25 | 50 | 69 | 0 | 1.2 |
| Copolymer 10 | 140 | 100 | 50 | 69 | 10.5 | 10.1 |
|  | 140 | 50 | 50 | 76 | 7.1 | 6.4 |
|  | 140 | 25 | 50 | 85 | 4.4 | 3.3 |

EXAMPLE 5

Blending of the Styrene Based Resin (SAN Resin) and the Graft Copolymer

1. Production of the Graft Copolymer
1) Production of the First Acryl Based Resin [E]
97.5 g of butyl acrylate, 2.5 g of 2-hydroxybutyl acrylate, 43 g of toluene and 0.2 g of the initiator AIBN, and 0.12 g of 1-octylmercaptane were dropped at 80° C. to the reactor that had the volume of 250 ml for 4 hours, and additionally polymerized for 3 hours at 95° C. to produce the polymer. The unreacted monomer in the solution was measured by using the gas chromatography, and it was confirmed that the conversion ratio was 98% (molecular weight: Mw=95 k, Mn=39 k).

2) Introduction of the Functional Group Capable of Being Reacted with the Radical, to the Main Chain of the First Acryl Based Resin
260 g of toluene was put into 140 g of the first acryl based resin [E] solution that was produced in 1), 1 g of the p-toluene sulfonic acid, and 3.5 g of the thioglycolic acid were put thereinto, and they were reacted with each other for 4 hours while they were refluxed. After the reaction was finished, they were dropped to methanol and precipitated. Subsequently, toluene was added to the precipitate, and heated to remove methanol in the polymer as the azeotrope. Through this process, the first acryl based resin [E'] polymer solution including SH could be obtained.

3) Graft Polymerization
32 g of the modified first acryl based resin [E'] solution (TSC 40%) that was obtained in the step 2), 79.17 g of MMA, 4.17 g of MA, and 0.26 g of AIBN were put into the polymerization device that had the volume of 250 mL, and they were reacted with each other for 12 hours while maintaining at 70° C. After the reaction was finished, the polymerization solution was precipitated in methanol to obtain the graft copolymer 13.

2. Blending of the SAN Resin and the Graft Copolymer
100 g of the graft copolymer 5 and 300 g of SAN (LG Chemicals (trademark: SAN80HF)) were uniformly mixed with each other and pushed by using a single screw extruder to produce a pellet in which two resins were mixed with each other.

EXAMPLE 6

Blending of the Styrene Based Resin (SAN Resin) and the Graft Copolymer

1. Production of the Graft Copolymer
1) Production of the First Acryl Based Resin [F]
70 g of butyl acrylate, 3 g of 2-hydroxybutyl acrylate, 27 g of styrene, 30 g of toluene and 0.3 g of the initiator AIBN, and 0.1 g of 1-octylmercaptane were dropped at 70° C. to the reactor that had the volume of 250 ml for 4 hours, and additionally polymerized for 3 hours at 95° C. to produce the polymer. The unreacted monomer in the solution was measured by using the gas chromatography, and it was confirmed that the conversion ratio was 98% (molecular weight: Mw=170 k, Mn=62 k).

2) Introduction of the Functional Group that was Capable of Being Reacted with the Radical, to the Main Chain of the First Acryl Based Resin
200 g of toluene was additionally put into 200 g of the first acryl based resin [F] solution that was produced in (1), 1 g of the p-toluene sulfonic acid, and 6 g of the thioglycolic acid were put thereinto, and they were reacted with each other for 4 hours while they were refluxed. After the reaction was finished, they were dropped to methanol and precipitated. Subsequently, toluene was added to the precipitate, and heated to remove methanol in the polymer as the azeotrope. Through this process, the first acryl based resin [F'] polymer solution including SH could be obtained.

3) Graft Polymerization
32 g of the modified first acryl based resin [F'] solution (TSC 40%), 79.17 g of MMA, 4.17 g of MA, and 0.26 g of AIBN were put into the polymerization device that had the volume of 250 mL, and they were reacted with each other for 12 hours while maintaining at 70° C. under the nitrogen atmosphere. After the reaction was finished, the polymerization solution was precipitated in hexane to obtain the graft copolymer 14.

2. Blending of the SAN Resin and the Graft Copolymer
100 g of the graft copolymer 14 and 300 g of SAN (LG Chemicals (trademark: SAN80HF)) were uniformly mixed with each other and pushed by using a single screw extruder to produce a pellet in which two resins were mixed with each other.

EXAMPLE 7

Blending of the Styrene Based Resin (SAN Resin) and the Graft Copolymer

1. Blending of the SAN Resin and the Graft Copolymer
210 g of the graft copolymer 14 that was produced in Example 6 and 90 g of SAN were uniformly mixed with each other and pushed by using a single screw extruder to produce a pellet in which two resins were mixed with each other.

EXAMPLE 8

Blending of the Styrene Based Resin (SAN Resin) and the Graft Copolymer

1. Blending of the SAN Resin and the Graft Copolymer
210 g of the graft copolymer 13 that was produced in Example 5 and 90 g of SAN (LG Chemicals (trademark:

SAN80HF)) were uniformly mixed with each other and pushed by using a single screw extruder to produce a pellet in which two resins were mixed with each other.

EXAMPLE 9

Blending of the Styrene Based Resin (SAN Resin) and the Graft Copolymer

1. Production of the Graft Copolymer
1) Production of the First Acryl Based Resin [G]

77 g of butyl acrylate, 3 g of 2-hydroxybutyl acrylate, 20 g of styrene, 30 g of toluene and 0.3 g of the initiator AIBN, and 0.08 g of 1-octylmercaptane were dropped at 70° C. to the reactor that had the volume of 250 ml for 4 hours, and additionally polymerized for 3 hours at 95° C. to produce the polymer. The unreacted monomer in the solution was measured by using the gas chromatography, and it was confirmed that the conversion ratio was 98% (molecular weight: Mw=190 k, Mn=90 k).

2) Introduction of the Functional Group that was Capable of Being Reacted with the Radical, to the Main Chain of the First Acryl Based Resin 400 g of toluene was additionally put into 200 g of the first acryl based resin [G] solution, 1 g of the p-toluene sulfonic acid, and 6 g of the thioglycolic acid were put thereinto, and they were reacted with each other for 4 hours while they were refluxed. After the reaction was finished, they were dropped to methanol and precipitated. Subsequently, toluene was added to the precipitate, and heated to remove methanol in the polymer as the azeotrope. Through this process, the first acryl based resin [G'] polymer solution including SH could be obtained.

3) Graft Polymerization 40 g of the modified first acryl based resin [G'] solution (TSC 33%), 79.17 g of MMA, 4.17 g of MA, and 0.26 g of AIBN were put into the polymerization device that had the volume of 250 mL, and they were reacted with each other for 12 hours while maintaining at 70° C. under the nitrogen atmosphere. After the reaction was finished, the polymerization solution was precipitated in hexane to obtain the graft copolymer 15.

2. Blending of the SAN Resin and the Graft Copolymer 100 g of the graft copolymer 15 and 300 g of SAN (LG Chemicals (trademark: SAN80HF)) were uniformly mixed with each other and pushed by using a single screw extruder to produce a pellet in which two resins were mixed with each other.

EXAMPLE 10

Blending of the Styrene Based Resin (SAN Resin) and the Graft Copolymer

1. Blending of the SAN Resin and the Graft Copolymer 200 g of the graft copolymer 15 that was produced in Example 9 and 100 g of SAN (LG Chemicals (trademark: SAN80HF)) were uniformly mixed with each other and pushed by using a single screw extruder to produce a pellet in which two resins were mixed with each other.

EXAMPLE 11

Blending of the Styrene Based Resin (SAN Resin) and the Graft Copolymer

1. Production of the Graft Copolymer
1) Production of the First Acryl Based Resin [H]

77 g of butyl acrylate, 3 g of 2-hydroxybutyl acrylate, 20 g of styrene, 30 g of toluene and 0.3 g of the initiator AIBN, and 0.08 g of 1-octylmercaptane were dropped at 70° C. to the reactor that had the volume of 250 ml for 4 hours, and additionally polymerized for 3 hours at 95° C. to produce the polymer. The unreacted monomer in the solution was measured by using the gas chromatography, and it was confirmed that the conversion ratio was 98% (molecular weight: Mw=190 k, Mn=90 k).

2) Introduction of the Functional Group that was Capable of Being Reacted with the Radical, to the Main Chain of the First Acryl Based Resin 400 g of toluene was additionally put into 200 g of the first acryl based resin [H] solution, 1 g of the p-toluene sulfonic acid, and 6 g of the thioglycolic acid were put thereinto, and they were reacted with each other for 4 hours with refluxing. After the reaction was finished, they were dropped to methanol and precipitated. Subsequently, toluene was added to the precipitate, and heated to remove methanol in the polymer as the azeotrope. Through this process, the first acryl based resin [H'] polymer solution including SH could be obtained.

3) Graft Polymerization 40 g of the modified first acryl based resin [H'] solution (TSC 33%), 75.17 g of MMA, 4.17 g of MA, 4 g of CHMI, and 0.26 g of AIBN were put into the polymerization device that had the volume of 250 mL, and they were reacted with each other for 12 hours while maintaining at 70° C. under the nitrogen atmosphere. After the reaction was finished, the polymerization solution was precipitated in hexane to obtain the graft copolymer 16.

2. Blending of the SAN Resin and the Graft Copolymer 100 g of the graft copolymer 16 and 300 g of SAN (LG Chemicals (trademark: SAN80HF)) were uniformly mixed with each other and pushed by using a single screw extruder to produce a pellet in which two resins were mixed with each other.

EXAMPLE 12

Blending of the Styrene Based Resin (SAN Resin) and the Graft Copolymer

1. Blending of the SAN Resin and the Graft Copolymer 200 g of the graft copolymer 16 that was produced in Example 11 and 100 g of SAN (LG Chemicals (trademark: SAN80HF)) were uniformly mixed with each other and pushed by using a single screw extruder to produce a pellet in which two resins were mixed with each other.

<Production of the Film and Stretching>

10 g of the blended pellet was processed by using the hot press to produce the film having the thickness in the range of 100 μm (micrometers) to 132 μm (micrometers) under the conditions of 240° C. and 150 bar. This film was stretched under the following conditions to produce the retardation film. The stretching conditions and the retardation values of the produced films are described in the following Table 9.

TABLE 9

| Example (thickness of the film) | Stretching temperature (°C.) | Stretching ratio (%) | Stretching rate (mm/min) | Thickness of the film (μm) | in-plane retardation value (nm) | Thickness retardation value (nm) |
|---|---|---|---|---|---|---|
| 5 | 112 | 100 | 50 | 67 | 300 | 213 |
| (132 μm) | 112 | 50 | 50 | 99 | 272 | 272 |
|  | 112 | 10 | 50 | 131 | 122 | 130 |
| 6 | 112 | 100 | 50 | 64 | 310 | 330 |
| (120 μm) | 112 | 50 | 50 | 95 | 262 | 290 |
|  | 112 | 10 | 50 | 118 | 115 | 142 |
| 7 | 112 | 100 | 50 | 64 | 392 | 187 |
| (120 μm) | 112 | 50 | 50 | 95 | 197 | 89 |
|  | 112 | 10 | 50 | 118 | 37 | 18 |
| 8 | 112 | 100 | 50 | 78 | 263 | 122 |
| (100 μm) | 112 | 50 | 50 | 85 | 170 | 83 |
|  | 112 | 10 | 50 | 95 | 69 | 35 |
| 9 | 112 | 100 | 50 | 68 | 300 | 310 |
| (110 μm) | 112 | 50 | 50 | 90 | 250 | 280 |
|  | 112 | 10 | 50 | 110 | 110 | 138 |
| 10 | 112 | 100 | 50 | 68 | 410 | 200 |
| (120 μm) | 112 | 50 | 50 | 97 | 200 | 95 |
|  | 112 | 10 | 50 | 115 | 69 | 35 |
| 11 | 117 | 100 | 50 | 67 | 295 | 310 |
| (110 μm) | 117 | 50 | 50 | 91 | 250 | 283 |
|  | 117 | 10 | 50 | 105 | 112 | 141 |
| 12 | 117 | 100 | 50 | 68 | 420 | 210 |
| (120 μm) | 117 | 50 | 50 | 97 | 205 | 97 |
|  | 117 | 10 | 50 | 118 | 67 | 35 |

The invention claimed is:

1. An optical film consisting essentially of:
a graft copolymer including one type of (meth)acryl based resins of which the glass transition temperature is less than 0° C. and one type of (meth)acryl based resins of which the glass transition temperature is 0° C. or more, and
a resin that has styrene or derivatives thereof,
wherein the (meth)acryl based resins of which the glass transition temperature is less than 0° C. comprises (meth)acryl based monomer and (meth)acrylic acid ester based monomer having a functional group,
wherein the amount of the (meth)acrylic acid ester based monomer having a functional group is in the range of 0.1 to 50 mole %,
wherein the graft copolymer has a structure in which the (meth)acryl based resins of which the glass transition temperature is less than 0° C. form a main chain and the (meth)acryl based resins of which the glass transition temperature is 0° C. or more form a side chain,
wherein the side chain is introduced into the main chain via a functional group capable of reacting with a radical, and
wherein the functional group capable of reacting with a radical is a —SH group.

2. An optical film consisting essentially of:
a graft copolymer including one type of (meth)acryl based resins of which the glass transition temperature is less than 0° C. and one type of (meth)acryl based resins of which the glass transition temperature is 0° C. or more, and
a resin that has styrene or derivatives thereof,
wherein the (meth)acryl based resins of which the glass transition temperature is less than 0° C. comprises (meth)acryl based monomer and (meth)acrylic acid ester based monomer having a functional group,
wherein the amount of the (meth)acrylic acid ester based monomer having a functional group is in the range of 0.1 to 50 mole %,
wherein the graft copolymer has a structure in which the (meth)acryl based resins of which the glass transition temperature is less than 0° C. form a main chain and the (meth)acryl based resins of which the glass transition temperature is 0° C. or more form a side chain, and
wherein the structure of the graft copolymer comprises only one main chain.

3. The optical film as set forth in claim 1 or 2, wherein the (meth)acryl based resin in which the glass transition temperature is 0° C. or more includes methyl methacrylate (MMA) in an amount of 50 mol % or more.

4. The optical film as set forth in claim 1 or 2, wherein among the graft copolymers, the (meth)acryl based resin in which the glass transition temperature is less than 0° C. and the (meth)acryl based resin in which the glass transition temperature is 0° C. or more are included in the weight ratio in the range of 95:5 to 5:95.

5. The optical film as set forth in claim 1 or 2, wherein the graft copolymer has a weight average molecular weight in the range of 50000 to 2000000, and a number average molecular weight in the range of 10000 to 1000000.

6. The optical film as set forth in claim 1 or 2, wherein the resin that has the styrene or derivatives thereof includes the styrene or the derivatives thereof in the amount of 30% by weight or more.

7. The optical film as set forth in claim 1 or 2, wherein the weight ratio of the resin that has the graft copolymer and the styrene or the derivatives thereof is in the range of 5:95 to 95:5.

8. The optical film as set forth in claim 1 or 2, wherein the optical film includes the styrene or the derivatives thereof in the amount in the range of 20 to 95% by weight.

9. A liquid crystal display device comprising a liquid crystal cell, and a first polarizing plate and a second polarizing plate that are positioned on both sides of the liquid crystal cell, wherein the liquid crystal display device comprises one or more optical films according to claim 1 or 2 that are positioned between at least one of the first polarizing plate and the second polarizing plate and the liquid crystal cell.

10. The optical film as set forth in claim 1 or 2, wherein the (meth)acryl based resin includes a (meth)acryl based monomer that has or does not have at least one of substituent that is selected from an alkyl group, an alkylene group and an aromatic group, having 1 to 12 carbon atoms.

11. A liquid crystal display device comprising a liquid crystal cell, and a first polarizing plate and a second polarizing plate that are positioned on both sides of the liquid crystal cell,
   wherein the liquid crystal display device comprises one or more optical films according to claim 1 or 2 that are positioned between at least one of the first polarizing plate and the second polarizing plate and the liquid crystal cell.

12. The optical film as set forth in claim 1 or 2, wherein the graft copolymer is a bulk polymerized or a solution polymerized graft copolymer.

* * * * *